US012659649B2

(12) United States Patent
Rao et al.

(10) Patent No.: US 12,659,649 B2
(45) Date of Patent: Jun. 16, 2026

(54) FULL-BANDWIDTH DUAL-SIDED SPEAKER DEVICE

(71) Applicant: MERRY ELECTRONICS (SUZHOU) CO., LTD., Jiangsu Province (CN)

(72) Inventors: LiGuo Rao, Jiangsu Province (CN); ChunLong Zheng, Jiangsu Province (CN)

(73) Assignee: MERRY ELECTRONICS (SUZHOU) CO., LTD., Jiangsu Province (CN)

(*) Notice: Subject to any disclaimer, the term of this patent is extended or adjusted under 35 U.S.C. 154(b) by 158 days.

(21) Appl. No.: 18/779,779

(22) Filed: Jul. 22, 2024

(65) Prior Publication Data

US 2025/0106547 A1 Mar. 27, 2025

(30) Foreign Application Priority Data

Sep. 27, 2023 (CN) ........................ 202311266055.2

(51) Int. Cl.

| | |
|---|---|
| ***H04R 1/24*** | (2006.01) |
| ***H04R 7/04*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ................. *H04R 1/24* (2013.01); *H04R 7/04* (2013.01); *H04R 9/025* (2013.01); *H04R 9/046* (2013.01); *H04R 9/06* (2013.01)

(58) Field of Classification Search

CPC . H04R 1/24; H04R 9/06; H04R 9/025; H04R 9/063; H04R 1/345; H04R 1/26; H04R 2400/11

See application file for complete search history.

(56) References Cited

U.S. PATENT DOCUMENTS

2023/0403499 A1* 12/2023 Voishvillo .............. H04R 7/127

FOREIGN PATENT DOCUMENTS

| | | |
|---|---|---|
| CN | 203563193 U | 4/2014 |
| CN | 216775010 U | 6/2022 |
| CN | 217116371 U | 8/2022 |
| CN | 218006502 U | 12/2022 |
| CN | 113498001 B | 5/2023 |

* cited by examiner

*Primary Examiner* — Kile O Blair

(74) *Attorney, Agent, or Firm* — Birch, Stewart, Kolasch & Birch, LLP

(57) ABSTRACT

A full-bandwidth dual-sided speaker device is disclosed, including a magnetic flux guiding plate, a first and a second magnetic circuit modules, a first, a second and a third vibration assemblies. The first magnetic circuit module is disposed above the magnetic flux guiding plate, and the second magnetic circuit module is disposed under the magnetic flux guiding plate. The first vibration assembly is disposed above the first magnetic circuit module, and the second vibration assembly is disposed under the second magnetic circuit module. The third vibration assembly is disposed above the magnetic flux guiding plate, and the third vibration assembly is corresponding to above the outer side of the second magnetic circuit module. The third vibration assembly is positioned outside the first vibration assembly. The first, second and third vibration assemblies are arranged corresponding to a central axial line.

21 Claims, 5 Drawing Sheets

FULL-BANDWIDTH DUAL-SIDED SPEAKER DEVICE

CROSS REFERENCE TO RELATED APPLICATION

This application claims the priority benefit of Chinese Patent Application Serial Number 2023112660552, filed on Sep. 27, 2023, the full disclosure of which is incorporated herein by reference.

BACKGROUND

Technical Field

This disclosure is related to a technical field of a speaker, and particularly, is related to a full-bandwidth dual-sided speaker device.

Related Art

In the current market, a driver applied to a speaker is generally composed of a single woofer or a combination of a woofer and a tweeter. The type of the woofer is typically a dynamic coil type, and the type of the tweeter is a dynamic coil type or a balanced armature type, and both the structures of the woofer and the tweeter are independent structures. Because there is no midrange driver to balance the sound of the tweeter and the woofer, the absence of the midrange driver leads to the more monotonous sound of the speaker and fails to meet the midrange tone and thus, the fullness of the tone of the speaker is insufficient. Simultaneously, because the independent structure of the woofer and the tweeter results in the difficulty of mounting the speaker and so on and fails to meet the coaxial configuration of the woofer, the midrange driver and the tweeter, the sound of the speaker is unbalanced on the low frequency range, the midrange and the high frequency range and it causes the terrible listening experience.

SUMMARY

The present embodiment of the present application provides a full-frequency dual-sided speaker device which utilizes cooperation of two sets of magnetic circuit modules and three sets of vibration assemblies to address the issue that the sound of the speaker is unbalanced on the low frequency range, the midrange and the high frequency range and the unbalanced sound of the speaker causes the terrible listening experience.

To address the abovementioned technical issues, the present application is implemented as follows.

A full-frequency dual-sided speaker device is provided, including: a magnetic flux guiding plate, a first magnetic circuit module, a second magnetic circuit module, a first vibration assembly, a second vibration assembly and a third vibration assembly. The first magnetic circuit module includes a first main magnet and a first auxiliary magnet both disposed on one side of the magnetic flux guiding plate, wherein the first auxiliary magnet is disposed on the outer side of the first main magnet. The second magnetic circuit module includes a second main magnet and a second auxiliary magnet both disposed on the other side of the magnetic flux guiding plate, wherein the second auxiliary magnet is disposed on the outer side of the second main magnet. The first vibration assembly includes a first bracket, a first diaphragm and a first voice coil, wherein the first bracket is disposed on the magnetic flux guiding plate and is located on the outer side of the first magnetic circuit module, the first diaphragm is disposed above the first bracket and is located on the first magnetic circuit module, and the first voice coil is disposed under the first diaphragm and is disposed between the first main magnet and the first auxiliary magnet. The second vibration assembly includes a second bracket, a second diaphragm and a second voice coil, wherein the second bracket is disposed on the outer side of the second auxiliary magnet, the second diaphragm is disposed under the second bracket and is located under the second magnetic circuit module, and the second voice coil is disposed above the second diaphragm and is disposed between the second main magnet and the second auxiliary magnet. The third vibration assembly includes a third bracket, a third diaphragm and a third voice coil, wherein the third bracket is disposed on the outer side of the second bracket, the third diaphragm is disposed between the first bracket and the third bracket, the third diaphragm is disposed above the second auxiliary magnet, the third voice coil is disposed under the third diaphragm, and the third voice coil is disposed between the second auxiliary magnet and the second bracket. When the extension line perpendicular to the center of the magnetic flux guiding plate is set as a central axial line, the first vibration assembly, the second vibration assembly and the third vibration assembly are arranged corresponding to the central axial line.

In one embodiment, the first magnetic circuit module includes a first magnetic guiding plate and a first auxiliary magnetic guiding plate, the first magnetic guiding plate is disposed on the first main magnet, and the first auxiliary magnetic guiding plate is disposed on the first auxiliary magnet.

In one embodiment, the second magnetic circuit module includes a second magnetic guiding plate disposed underneath the second main magnet.

In one embodiment, the second magnetic circuit module includes a magnetic guiding ring disposed on the magnetic flux guiding plate, and the magnetic guiding ring is positioned between the second voice coil and the second auxiliary magnet.

In one embodiment, the second auxiliary magnet has an inner side, and the magnetic guiding ring is attached to the inner side of the second auxiliary magnet.

In one embodiment, the second main magnet has an outer side corresponding to a lower side of the first auxiliary magnet.

In one embodiment, the first auxiliary magnet has an outer side and the second auxiliary magnet has an inner side, and the outer side of the first auxiliary magnet corresponds to the inner side of the second auxiliary magnet.

In one embodiment, the first bracket and the second bracket are positioned on two different sides of the magnetic flux guiding plate, the third bracket is positioned on the outer side of the first bracket and the outer side of the second bracket, and the first, second and third brackets are disposed relative to the central axial line.

In one embodiment, adjacent magnetic poles of the first main magnet and the second main magnet are the same, and adjacent magnetic poles of the first auxiliary magnet and the second auxiliary magnet are the same.

In one embodiment, the magnetic pole of the first main magnet disposed on the magnetic flux guiding plate is opposite to the magnetic pole of the first auxiliary magnet on the magnetic flux guiding plate.

In one embodiment, the magnet pole of the second main magnet disposed under the magnetic flux guiding plate is opposite to the magnetic pole of the second auxiliary magnet under the magnetic flux guiding plate.

In one embodiment, the inner face on one end of the second bracket is disposed under the second auxiliary magnet, and the other end of the second bracket extends outward and upward; one end of the third bracket is disposed on the outer face on the other end of the second bracket, the other end of the third bracket extends outward and upward, the outer side of the third diaphragm is disposed on the other end of the third bracket, and the inner side of the third diaphragm is disposed on the outer side of the first bracket.

In one embodiment, one end of the first bracket extends upward and inward, the inner face on the end of the first bracket is fixed above the first auxiliary magnet, and the first diaphragm is fixed on the outer side of the end of the first bracket.

In one embodiment, the full-bandwidth dual-sided speaker device further includes a glue groove disposed on the third bracket, the glue groove of the third bracket is filled with glue to attach the third bracket to the second bracket so that the second bracket is fixed to and connected to the third bracket.

In one embodiment, the structural area of the second magnetic circuit module is greater than the structural area of the first magnetic circuit module.

In one embodiment, the structural area of the second magnetic circuit module is equal to the structural area of the magnetic flux guiding plate.

In one embodiment, the first main magnet has an area equal to that of the first magnetic guiding plate, and the first auxiliary magnet has an area equal to that of the first auxiliary magnetic guiding plate.

In one embodiment, the second main magnetic has an area equal to that of the second magnet guiding plate.

In one embodiment, the vertical height of the third diaphragm relative to the magnetic flux guiding plate is lower than the vertical height of the first diaphragm relative to the magnetic flux guiding plate.

In one embodiment, the third bracket is connected to the second bracket, the third bracket has multiple spaced-apart blocks with their respective positions, the second bracket has an outer periphery corresponding to the multiple positions of the blocks, and multiple slots are provided at these positions with multiple blocks correspondingly engaged with the multiple slots.

In one embodiment, the first vibration assembly is configured to vibrate and produce sound in a high-frequency range, the second vibration assembly is configured to vibrate and produce sound in a mid-frequency range, while the third vibration assembly is configured to produce sound in a low-frequency range.

A full-bandwidth dual-sided speaker device is provided in the present application, comprising a magnetic flux guiding plate, a first magnetic circuit module, a second magnetic circuit module, a first vibration assembly, a second vibration assembly and a third vibration assembly. The first magnetic circuit module is disposed on the magnetic flux guiding plate, and the second magnetic circuit module is disposed under the magnetic flux guiding plate. The first vibration assembly is disposed on the first magnetic circuit module, the second vibration assembly is disposed under the second magnetic circuit module, the third vibration assembly is disposed on the magnetic flux guiding plate, and the third vibration assembly is corresponding to the upper side of the outer part of the second magnetic circuit module. The third vibration assembly is positioned outside the first vibration assembly, wherein, when the extension line perpendicular to the center of the magnetic flux guiding plate is set as a central axial line, the first vibration assembly, the second vibration assembly, and the third vibration assembly are arranged corresponding to the central axial line. The present application achieves the coaxial configuration of the drivers for the low frequency range, the midrange and the high frequency range through the combination of two sets of magnetic circuit modules and three sets of vibration assemblies to achieve the sound coordination for the low frequency range, the midrange and the high frequency range so that the listening experience would be improved.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings herein are provided to have a further understanding on the present application and constitutes a part of the present application. The schematic embodiments and the description of the present application is used to explain the present application instead of constituting inappropriate limitation. In the drawings.

Figure 1:
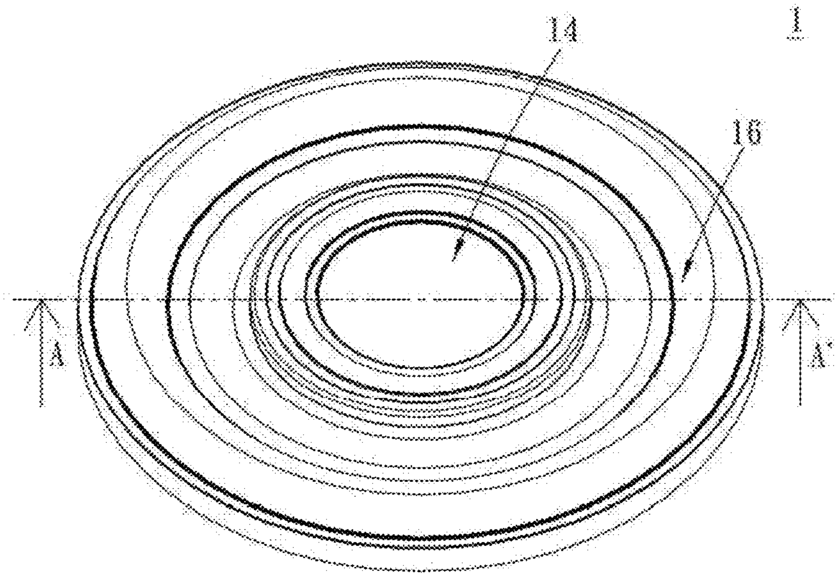
FIG. 1 is a three-dimensional view of the full-band dual-sided speaker device of the present application.

The description is as follows, in conjunction with the accompanying drawings: 1: full-band dual-sided speaker device; 11: magnetic flux guiding plate; 110: central axial line; 12: first magnetic circuit module; 121: first main magnet; 122: first auxiliary magnet; 123: first magnetic guiding plate; 124: first auxiliary magnetic guiding plate; 13: second magnetic circuit module; 131: second main magnet; 132: second auxiliary magnet; 133: second magnetic guiding plate; 134: magnetic guiding ring; 14: first vibration assembly; 141: first bracket; 142: first diaphragm; 143: first voice coil; 15: second vibration assembly; 151: second bracket; 1510: slot; 152: second diaphragm; 153: second voice coil; 16: third vibration assembly; 161: third bracket; 1610: glue; 1611: glue groove; 1612: block; 1613: first through hole; 1614: second through hole; 162: third diaphragm; 163: third voice coil.

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

Figure 2:
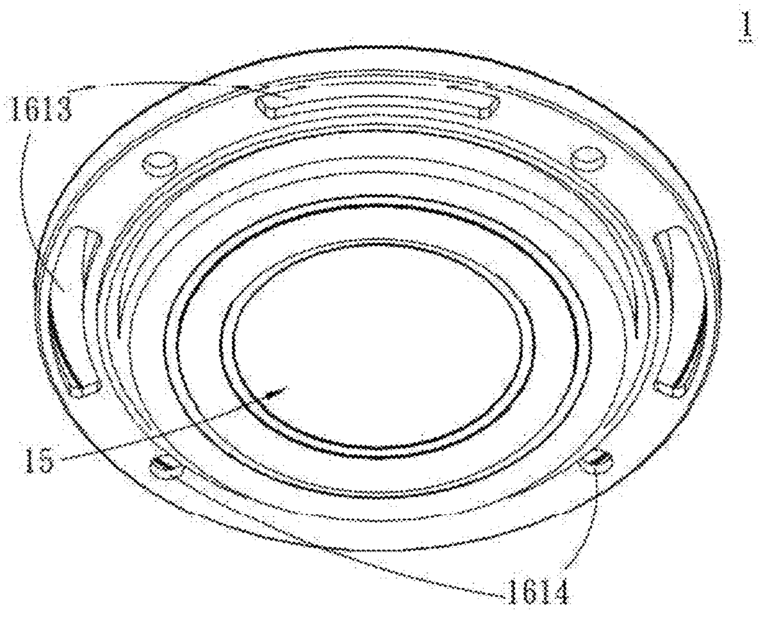
FIG. 2 is another three-dimensional view of the full-band dual-sided speaker device of the present application.
Figure 3:
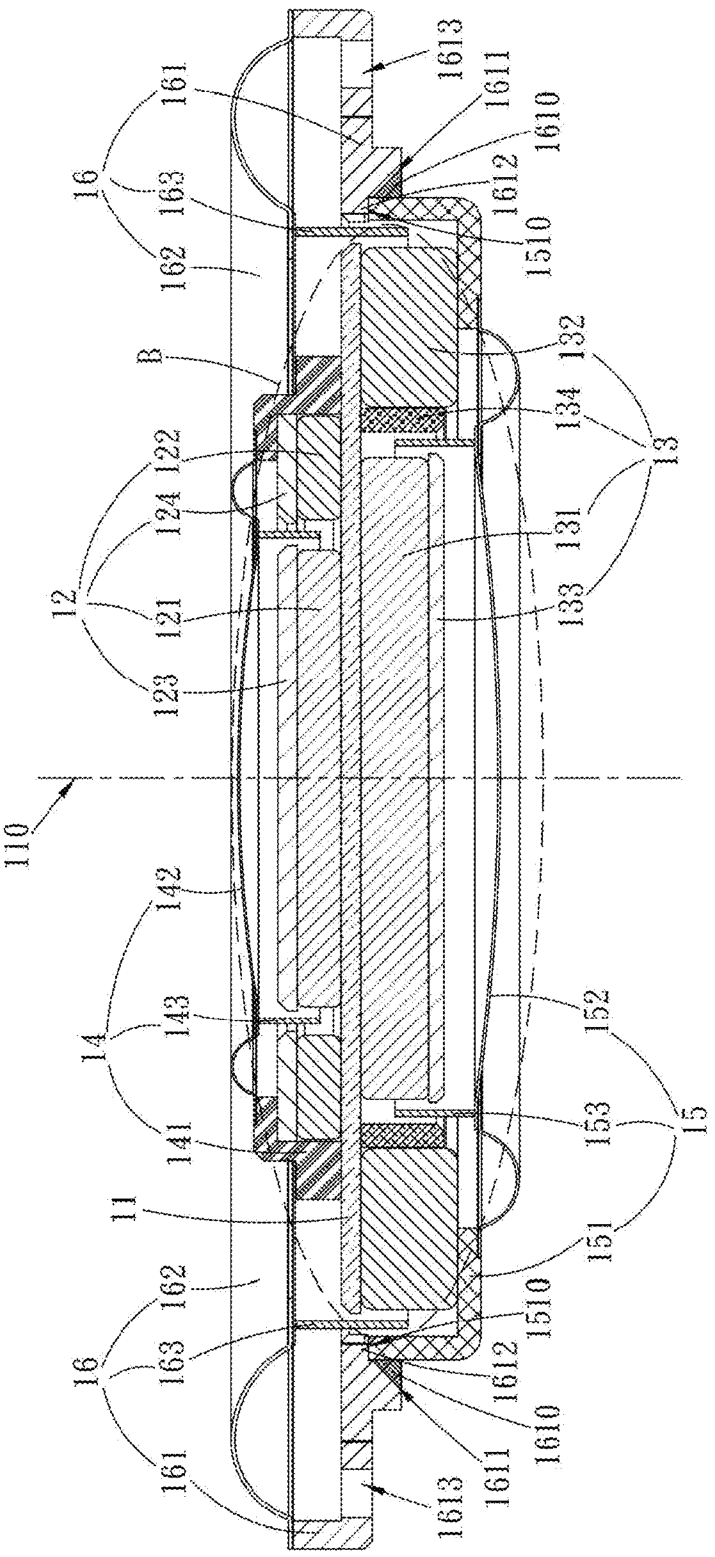
FIG. 3 is a sectional view along line A-A' of FIG. 1.
Figure 4:
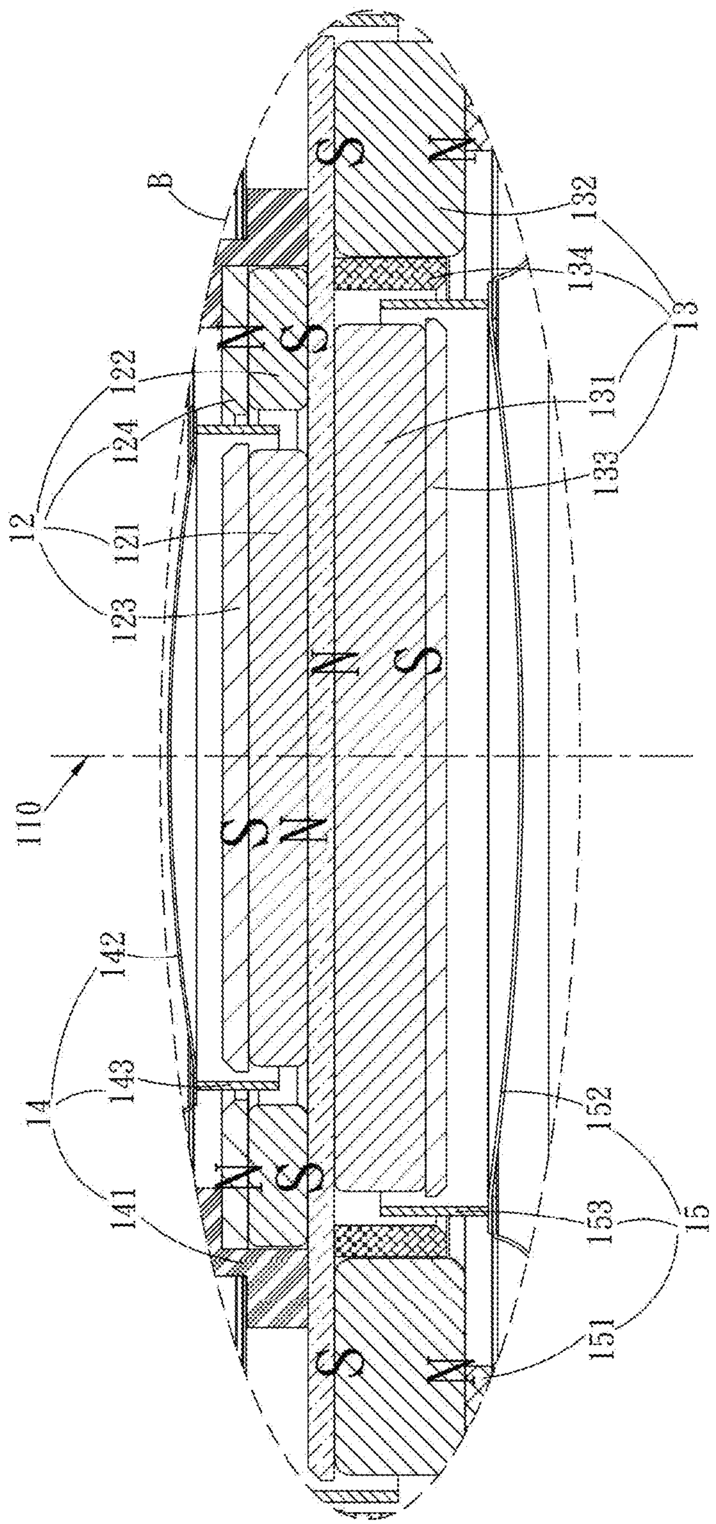
FIG. 4 is an enlarged view of the B region of FIG. 3.
Figure 5:
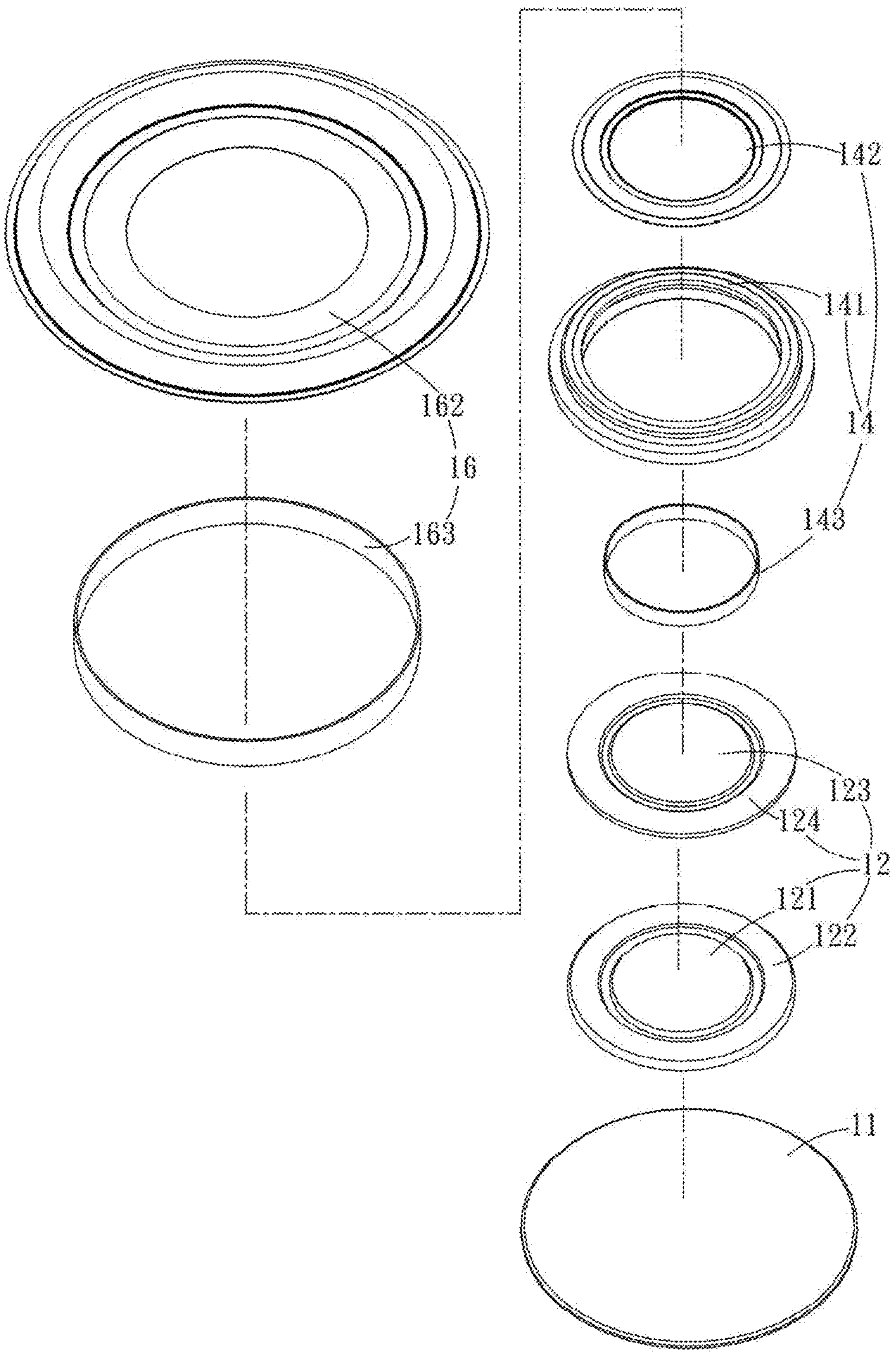
FIG. 5 is an exploded view of the upper half of the full-band dual-sided speaker device of the present application.
Figure 6:
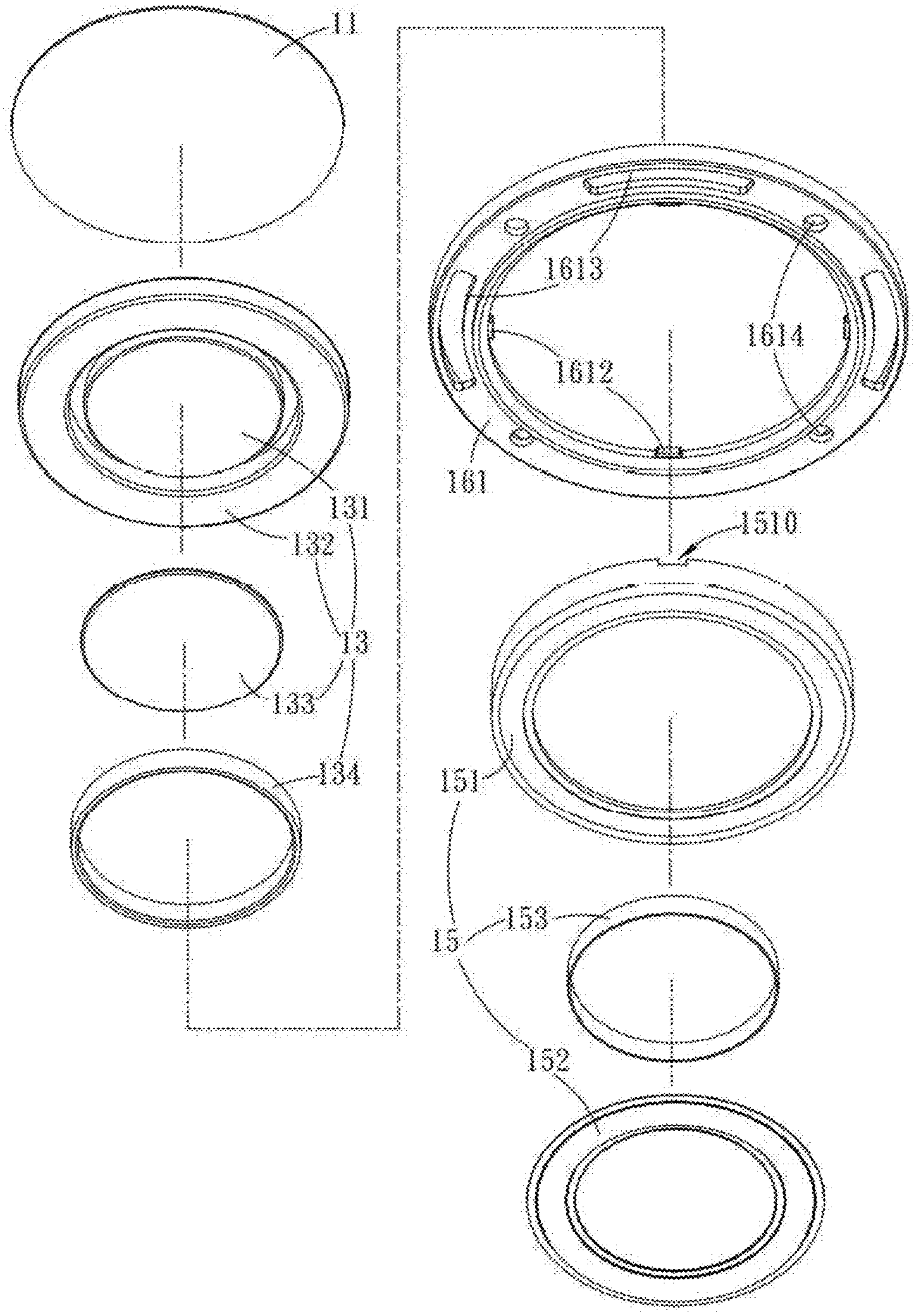
FIG. 6 is an exploded view of the lower half of the full-band dual-sided speaker device of the present application.

Please refer to FIG. 1 to FIG. 6, FIG. 1 is a three-dimensional view of the full-band dual-sided speaker device of the present application, FIG. 2 is another three-dimensional view, FIG. 3 is a sectional view along line A-A' of FIG. 1, FIG. 4 is an enlarged view of the B region of FIG. 3, FIG. 5 is an exploded view of the upper half of the full-band dual-sided speaker device of the present application and FIG. 6 is an exploded view of the lower half of the full-band dual-sided speaker device. As shown in the figures, the present application provides a full-band dual-sided speaker device 1, including: a magnetic flux guiding plate 11, a first magnetic circuit module 12, a second magnetic circuit module 13, a first vibration assembly 14, a second vibration assembly 15 and a third vibration assembly 16. The first magnetic circuit module 12 includes a first main magnet 121 and a first auxiliary magnet 122, the first main magnet 121 and the first auxiliary magnet 122 are disposed on one side of the magnetic flux guiding plate 11, and the first auxiliary magnet 122 is located on the outer side of the first main magnet 121. The second magnetic circuit module 13 includes a second main magnet 131 and a second auxiliary magnet 132, the second main magnet 131 and the second auxiliary magnet 132 are disposed on the other side of the magnetic flux guiding plate 11, and the second auxiliary magnet 132 is located on the outer side of the second main magnet 131. The first vibration assembly 14 includes a first bracket 141, a first diaphragm 142 and a first voice coil 143. The first bracket 141 is disposed on the magnetic flux guiding plate 11 and is located on the outer side of the first magnetic circuit module 12, the first diaphragm 142 is disposed above the first bracket 141 and is positioned above the first magnetic circuit module 12, and the first voice coil 143 is disposed under the first diaphragm 142, i.e., the first voice coil 143 is disposed on the side adjacent to the first magnetic circuit module 12. The first voice coil 143 is positioned between the first main magnet 121 and the first auxiliary magnet 122. The second vibration assembly 15 includes a second bracket 151, a second diaphragm 152 and a second voice coil 153. The second bracket 151 is disposed on the outer side of the second auxiliary magnet 132, the second diaphragm 152 is disposed under the second bracket 151 and is positioned under the second magnetic circuit module 13, and the second voice coil 153 is disposed above the second diaphragm 152, i.e., the second voice coil 153 is disposed on the side adjacent to the second magnetic circuit module 13. The second voice coil 153 is positioned between the second main magnet 131 and the second auxiliary magnet 132. The third vibration assembly 16 includes a third bracket 161, a third diaphragm 162 and a third voice coil 163. The third bracket 161 is disposed on the outer side of the second bracket 151, the third diaphragm 162 is disposed between the first bracket 141 and the third bracket 161 and is positioned above the second auxiliary magnet 132, and the third voice coil 163 is disposed under the third diaphragm 162 and is positioned between the second auxiliary magnet 132 and the second bracket 151. The extension line perpendicular to the center of the magnetic flux guiding plate 11 is set as an central axial line 110, and the first vibration assembly 14, the second vibration assembly 15, and the third vibration assembly 16 are disposed in correspondence to the central axial line 110. In other words, the central axial line 110 is a central line of the full-band dual-sided speaker device 1.

Please refer to FIG. 4 again. In this embodiment, the first magnetic circuit module 12 and the second magnetic circuit module 13 are oppositely disposed on the two sides of the magnetic flux guiding plate 11. The structure area of the second magnetic circuit module 13 is larger than the structure area of the first magnetic circuit module 12. The structure area of the second magnetic circuit module 13 is equal to the area of the magnetic flux guiding plate 11, i.e. the second magnetic circuit module 13 can cover the surface of one side of the magnetic flux guiding plate 11. The outer side of the second main magnet 131 is corresponding to the lower side of the first auxiliary magnet 122. The outer side of the first auxiliary magnet 122 is corresponding to the inner side of the second auxiliary magnet 132. Furthermore, the constitution of the magnetic fields of the first magnetic circuit module 12 and the second magnetic circuit module 13 are mainly through the corresponding relationship of the magnetic poles. The second main magnet 131 and the second auxiliary magnet 132 are set on the magnetic flux guiding plate 11 in a manner that the magnetic poles thereof are opposite to each other, and the adjacent magnetic poles of the first main magnet 121 and the second main magnet 131 are the same. The adjacent magnetic poles of the first auxiliary magnet 122 and the second auxiliary magnet 132 are the same. The arrangement of the S pole and the N pole of the first main magnet 121, the first auxiliary magnet 122, the second magnetic guiding plate 133 and the second auxiliary magnet 132 can be according to the aforementioned relationship.

In addition, the first magnetic circuit module 12 includes a first magnetic guiding plate 123 and a first auxiliary magnetic guiding plate 124, the first magnetic guiding plate 123 is disposed on the first main magnet 121, the first main magnet 121 and the first magnetic guiding plate 123 have the same area, the first auxiliary magnetic guiding plate 124 is disposed on the first auxiliary magnet 122, and the first auxiliary magnet 122 and the first auxiliary magnetic guiding plate 124 have the same area. The second magnetic circuit module 13 includes a second magnetic guiding plate 133, the second magnetic guiding plate 133 is disposed under the second main magnet 131, and the second main magnet 131 and the second magnetic guiding plate 133 have the same area. Through the magnetic guiding effect of the first magnetic guiding plate 123 and the first auxiliary magnetic guiding plate 124, the strength of the magnetic field of the first magnetic circuit module 12 is enhanced. Through the magnetic guiding effect of the second magnetic guiding plate 133, the strength of the magnetic field of the magnetic flux guiding plate 11 is enhanced. In addition, the second magnetic circuit module 13 includes a magnetic guiding ring 134, the magnetic guiding ring 134 is disposed underneath the magnetic flux guiding plate 11, the magnetic guiding ring 134 is disposed between the second voice coil 153 and the second auxiliary magnet 132, and the magnetic guiding ring 134 attaches to the inner side of the second auxiliary magnet 132, wherein the magnetic guiding ring 134 is a yoke made of magnetic guiding materials. So the magnetic guiding effect of the magnetic guiding ring 134 enhances the strength of the magnetic field of the second magnetic circuit module 13.

Please refer to FIG. 3 to FIG. 5 again, in this embodiment, the first bracket 141, the second bracket 151 and the third bracket 161 are all circle brackets which serve as the bracket bodies for mounting the first diaphragm 142, the second diaphragm 152 and the third diaphragm 162. The first bracket 141 and the second bracket 151 are respectively disposed on the different two sides of the magnetic flux guiding plate 11, and the third bracket 161 is disposed on the outer sides of the first bracket 141 and the second bracket 151. The first bracket 141, the second bracket 151 and the third bracket 161 are arranged corresponding to the central axial line 110 of the magnetic flux guiding plate 11.

The first bracket 141 is positioned outside the first auxiliary magnet 122 of the first magnetic circuit module 12, one end of the first bracket 141 extends upward and inward, and the inner face on the end of the first bracket 141 is fixed above the first auxiliary magnet 122 and the first auxiliary magnetic guiding plate 124. The first diaphragm 142 is a disc shape structure, the peripheral side of the first diaphragm 142 is fixed on the outer side of one end of the first bracket 141, wherein the first bracket 141 may be made of metal or plastic material, and the inner side of the first bracket 141 is fixed above the first auxiliary magnet 122 and the first auxiliary magnetic guiding plate 124 by laser welding or glue attachment.

The second bracket 151 is disposed on the outer side of the second auxiliary magnet 132, the inner face of one end of the second bracket 151 is positioned underneath the second auxiliary magnet 132, the second diaphragm 152 is a disc shape structure, and the peripheral side of the second diaphragm 152 is fixed on the outer side of one end of the second bracket 151. The other end of the second bracket 151 extends outward and upward to be a right angle, wherein the second bracket 151 is a yoke made of the magnetic guiding material, so that the magnetic guiding effect of the second bracket 151 enhances the strength of the magnetic field of the second auxiliary magnet 132 of the second magnetic circuit module 13.

One end of the third bracket 161 is positioned outside the other end of the second bracket 151, wherein the third bracket 161 is configured with a glue groove 1611, the glue groove 1611 of the third bracket 161 is filled with the glue 1610 to attach the third bracket 161 to the second bracket 151 so that the second bracket 151 is fixed to and connected to the third bracket 161. The other end of the third bracket 161 extends outward and upward, and the other end of the third bracket 161 extends upward beyond the magnetic flux guiding plate 11, wherein the third bracket 161 may be made of metal or plastic material. The third diaphragm 162 is a ring shape structure, the outer side of the third diaphragm 162 is disposed on the other end of the third bracket 161, and the inner side of the third diaphragm 162 is positioned outside of the first bracket 141.

Further, please refer to FIG. 3 and FIG. 6. To further strengthen the combined strength of the third bracket 161 and the second bracket 151, the third bracket 161 has a plurality of engaging blocks 1612 which are separately disposed, and a plurality of engaging grooves 1510 are disposed on the surrounding of the second bracket 151 in correspondence to the positions of the plurality of engaging grooves 1510, and the plurality of engaging blocks 1612 are correspondingly engaged with and connected to the plurality of engaging grooves 1510, and thus, the horizontal rotation of the combination of the third bracket 161 and the second bracket 151 is limited. In addition, the third bracket 161 further includes multiple first through holes 1613 and multiple second through holes 1614, and the multiple first through holes 1613 and the multiple second through holes 1614 connect the inner side and the outer side of the full-band dual-sided speaker device 1, and thus, it is beneficial for the air circulation between the inner and outer sides of the full-band dual-sided speaker device 1 to facilitate the full-band dual-sided speaker device 1 to generate the sound. The multiple first through holes 1613 are elongated holes, and the multiple second through holes 1614 are circular holes, and the number and the shape of the above-mentioned through holes can be adjusted according to the user's needs.

According to the above description, the first bracket 141 is disposed on the magnetic flux guiding plate 11, and one end of the first bracket 141 extends upward and inward so that the first bracket 141 is fixed to the lower side of the first diaphragm 142 and support the first diaphragm 142. The other end of the third bracket 161 extends outward and upward. When the other end of the third bracket 161 extends upward beyond the magnetic flux guiding plate 11, but does not exceed the highest point of the first bracket 141, the third bracket 161 is fixed to the lower side of the third diaphragm 162 and supports the third diaphragm 162. The vertical height of the third diaphragm 162 relative to the magnetic flux guiding plate 11 is lower compared to the vertical height of the first diaphragm 142 relative to the magnetic flux guiding plate 11. In other words, by dislocations that the first diaphragm 142 and the third diaphragm 162 are not located on the same plane, the first diaphragm 142 and the third diaphragm 162 exhibit a stepped structure with height differences, and thus, the resonance state of the first diaphragm 142 and the third diaphragm 162 on the same plane may not affect the vibration amplitude and the vibration frequency of the sounds generated by the first diaphragm 142 and the third diaphragm 162.

In this embodiment, when the first vibration assembly 14 in conjunction with the first magnetic circuit module 12 generates sound through vibration, the vibration frequency of the first diaphragm 142 is higher and the amplitude variation of the first diaphragm 142 is smaller and the first diaphragm 142 is suitable for the high-frequency range with the high frequency because the area of the first diaphragm 142 of the first vibration assembly 14 is relatively smaller than the area of the second diaphragm 152 and the third diaphragm 162. When the second vibration assembly 15 in conjunction with the second magnetic circuit module 13 generates sound through vibration, the vibration frequency of the second diaphragm 152 is medium and the amplitude variation of the second diaphragm 152 is medium and the second diaphragm 152 is suitable for the midrange with the medium frequency because the area of the second diaphragm 152 of the second vibration assembly 15 is between the area of the first diaphragm 142 and the area of the third diaphragm 162. When third vibration assembly 16 in conjunction with the second auxiliary magnet 132 of the second magnetic circuit module 13 generates sound through vibration, the vibration frequency of the third diaphragm 162 is lower and the amplitude variation of the third diaphragm 162 is larger and the third diaphragm 162 is suitable for the low-frequency range with the low frequency because the area of the third diaphragm 162 of the third vibration assembly 16 is relatively larger than the area of the first diaphragm 142 and the area of the second diaphragm 152. The diaphragm with larger areas as mentioned above is less sensitive to the vibration variation of the high-frequency, so the diaphragm with smaller areas is more suitable for the high frequency. As a result, the first vibration assembly 14 is configured to produce sound in the high-frequency range by the vibration, the second vibration assembly 15 is configured to produce sound in the mid-frequency range by the vibration, and the third vibration assembly 16 is configured to produce sound in the low-frequency range by the vibration.

In this embodiment, when the first voice coil 143 is conducted by electricity to generate a magnetic field and the strength and the direction of the magnetic field can be changed by currents and the first voice coil 143 undergoes the magnetic field of the first main magnet 121 and the first auxiliary magnet 122 of the first magnetic circuit module 12, the vibration of the first voice coil 143 changes and drives the first diaphragm 142 to generate the sound for the high-frequency range. Furthermore, when the second voice coil 153 is conducted by electricity to generate a magnetic field and the strength and the direction of the magnetic field can be changed by currents and the second voice coil 153 undergoes the magnetic field of the second main magnet 131 and the second auxiliary magnet 132 of the second magnetic circuit module 13, the vibration of the second voice coil 153 changes and drives the second diaphragm 152 to generate the sound for the midrange. Additionally, when the third voice coil 163 is conducted by electricity to generate a magnetic field and the strength and the direction of the magnetic field can be changed by currents and the third voice coil 163 undergoes the magnetic field of the second auxiliary magnet 132 of the second magnetic circuit module 13, the vibration of the third voice coil 163 changes and drives the third diaphragm 162 to generate the sound for the low-frequency range. The aforementioned high-frequency, mid-frequency, and low-frequency sounds represent different audio frequencies when compared to each other.

As the abovementioned, the present application provides a full-bandwidth dual-sided speaker device, comprising: a magnetic flux guiding plate, a first magnetic circuit module, a second magnetic circuit module, a first vibration assembly, a second vibration assembly and a third vibration assembly. The first magnetic circuit module is disposed above the magnetic flux guiding plate, and the second magnetic circuit module is disposed under the magnetic flux guiding plate. The first vibration assembly is disposed above the first magnetic circuit module, and the second vibration assembly is disposed under the second magnetic circuit module. The third vibration assembly is disposed above the magnetic flux guiding plate, and the third vibration assembly is corresponding to above the outer side of the second magnetic circuit module. The third vibration assembly is positioned outside the first vibration assembly. By the combination of two sets of magnetic circuit modules and three sets of vibrational components, the present application meets a single-unit coaxial configuration for low, mid, and high frequencies. This results in a well-coordinated sound across the three frequency ranges, delivering an overall impressive auditory experience.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A full-bandwidth dual-sided speaker device, comprising:

a magnetic flux guiding plate;

a first magnetic circuit module comprising a first main magnet and a first auxiliary magnet both disposed on one side of the magnetic flux guiding plate, wherein the first auxiliary magnet is disposed on an outer side of the first main magnet;

a second magnetic circuit module comprising a second main magnet and a second auxiliary magnet both disposed on the other side of the magnetic flux guiding plate, wherein the second auxiliary magnet is disposed on an outer side of the second main magnet;

a first vibration assembly comprising a first bracket, a first diaphragm and a first voice coil, wherein the first bracket is disposed on the magnetic flux guiding plate and is located on an outer side of the first magnetic circuit module, the first diaphragm is disposed above the first bracket and is located on the first magnetic circuit module, and the first voice coil is disposed under the first diaphragm and is disposed between the first main magnet and the first auxiliary magnet;

a second vibration assembly comprising a second bracket, a second diaphragm and a second voice coil, wherein the second bracket is disposed on an outer side of the second auxiliary magnet, the second diaphragm is disposed under the second bracket and is located under the second magnetic circuit module, and the second voice coil is disposed above the second diaphragm and is disposed between the second main magnet and the second auxiliary magnet; and a third vibration assembly comprising a third bracket, a third diaphragm and a third voice coil, wherein the third bracket is disposed on an outer side of the second bracket, the third diaphragm is disposed between the first bracket and the third bracket, the third diaphragm is disposed above the second auxiliary magnet, the third voice coil is disposed under the third diaphragm, and the third voice coil is disposed between the second auxiliary magnet and the second bracket, wherein, an extension line perpendicular to a center of the magnetic flux guiding plate is set as a central axial line, and the first vibration assembly, the second vibration assembly and the third vibration assembly are arranged corresponding to the central axial line.

2. The full-bandwidth dual-sided speaker device as claimed in claim 1, wherein the first magnetic circuit module comprises a first magnetic guiding plate and a first auxiliary magnetic guiding plate, the first magnetic guiding plate is disposed on the first main magnet, and the first auxiliary magnetic guiding plate is disposed on the first auxiliary magnet.

3. The full-bandwidth dual-sided speaker device as claimed in claim 2, wherein an area of the first main magnet is equal to an area of the first magnetic guiding plate, and an area of the first auxiliary magnet is equal to an area of the first auxiliary magnetic guiding plate.

4. The full-bandwidth dual-sided speaker device as claimed in claim 1, wherein the second magnetic circuit module comprises a second magnetic guiding plate disposed underneath the second main magnet.

5. The full-bandwidth dual-sided speaker device as claimed in claim 4, wherein an area of the second main magnet is equal to an area of the second magnetic guiding plate.

6. The full-bandwidth dual-sided speaker device as claimed in claim 1, wherein the second magnetic circuit module comprises a magnetic guiding ring disposed on the magnetic flux guiding plate, and the magnetic guiding ring is positioned between the second voice coil and the second auxiliary magnet.

7. The full-bandwidth dual-sided speaker device as claimed in claim 6, wherein the second auxiliary magnet has an inner side, and the magnetic guiding ring is attached to the inner side of the second auxiliary magnet.

8. The full-bandwidth dual-sided speaker device as claimed in claim 1, wherein the second main magnet has an outer side corresponding to a lower side of the first auxiliary magnet.

9. The full-bandwidth dual-sided speaker device as claimed in claim 1, wherein the first auxiliary magnet has an outer side and the second auxiliary magnet has an inner side, and the outer side of the first auxiliary magnet corresponds to the inner side of the second auxiliary magnet.

10. The full-bandwidth dual-sided speaker device as claimed in claim 1, wherein the first bracket and the second bracket are positioned on two different sides of the magnetic flux guiding plate, the third bracket is positioned on an outer side of the first bracket and an outer side of the second bracket, and the first, second and third brackets are disposed relative to the central axial line.

11. The full-bandwidth dual-sided speaker device as claimed in claim 1, wherein adjacent magnetic poles of the first main magnet and the second main magnet are the same, and adjacent magnetic poles of the first auxiliary magnet and the second auxiliary magnet are the same.

12. The full-bandwidth dual-sided speaker device as claimed in claim 1, wherein a magnetic pole of the first main magnet disposed on the magnetic flux guiding plate is opposite to a magnetic pole of the first auxiliary magnet on the magnetic flux guiding plate.

13. The full-bandwidth dual-sided speaker device as claimed in claim 1, wherein a magnet pole of the second main magnet disposed under the magnetic flux guiding plate is opposite to a magnetic pole of the second auxiliary magnet under the magnetic flux guiding plate.

14. The full-bandwidth dual-sided speaker device as claimed in claim 1, wherein an inner face on one end of the second bracket is disposed under the second auxiliary magnet, and the other end of the second bracket extends outward and upward; one end of the third bracket is disposed on an outer face on the other end of the second bracket, the other end of the third bracket extends outward and upward, an outer side of the third diaphragm is disposed on the other end of the third bracket, and an inner side of the third diaphragm is disposed on an outer side of the first bracket.

15. The full-bandwidth dual-sided speaker device as claimed in claim 1, wherein one end of the first bracket extends upward and inward, an inner face on the end of the first bracket is fixed above the first auxiliary magnet, and the first diaphragm is fixed on an outer side of the end of the first bracket.

16. The full-bandwidth dual-sided speaker device as claimed in claim 1, wherein the full-bandwidth dual-sided speaker device further comprises a glue groove disposed on the third bracket, the glue groove of the third bracket is filled with glue to attach the third bracket to the second bracket so that the second bracket is fixed to and connected to the third bracket.

17. The full-bandwidth dual-sided speaker device as claimed in claim 1, wherein a structural area of the second magnetic circuit module is greater than a structural area of the first magnetic circuit module.

18. The full-bandwidth dual-sided speaker device as claimed in claim 1, wherein a structural area of the second magnetic circuit module is equal to a structural area of the magnetic flux guiding plate.

19. The full-bandwidth dual-sided speaker device as claimed in claim 1, wherein a vertical height of the third diaphragm relative to the magnetic flux guiding plate is lower than a vertical height of the first diaphragm relative to the magnetic flux guiding plate.

20. The full-bandwidth dual-sided speaker device as claimed in claim 1, wherein the third bracket mounts and is connected to the second bracket, and the third bracket has a plurality of engaging blocks which are separately disposed, and a plurality of engaging grooves are disposed on a surrounding of the second bracket corresponding to positions of the plurality of engaging blocks, and the plurality of engaging blocks are correspondingly engaged with and connected to the plurality of engaging grooves.

21. The full-bandwidth dual-sided speaker device as claimed in claim 1, wherein the first vibration assembly is configured to vibrate and produce audio signals in a high-frequency range, the second vibration assembly is configured to vibrate and produce audio signals in a mid-frequency range, while the third vibration assembly is configured to vibrate and produce audio signals in a low-frequency range.

* * * * *